Oct. 22, 1963  A. C. CURTIS  3,108,012
METHOD OF CONDITIONING TRANSMISSION LINES IN SITU
Filed July 20, 1960  3 Sheets-Sheet 1
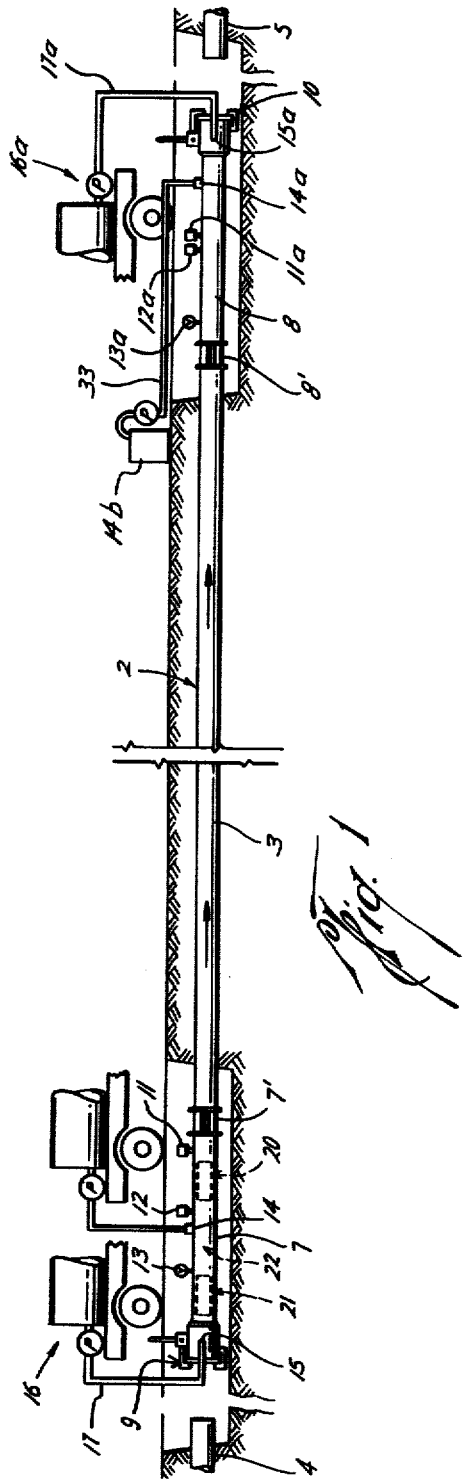
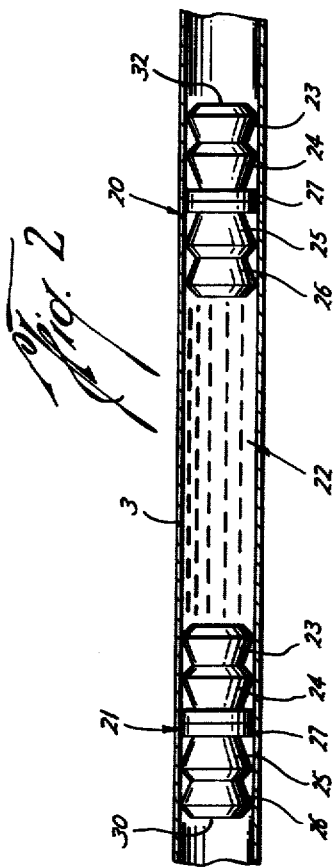
ARVEL C. CURTIS
INVENTOR.
BY *Hayden & Pravel*
ATTORNEYS

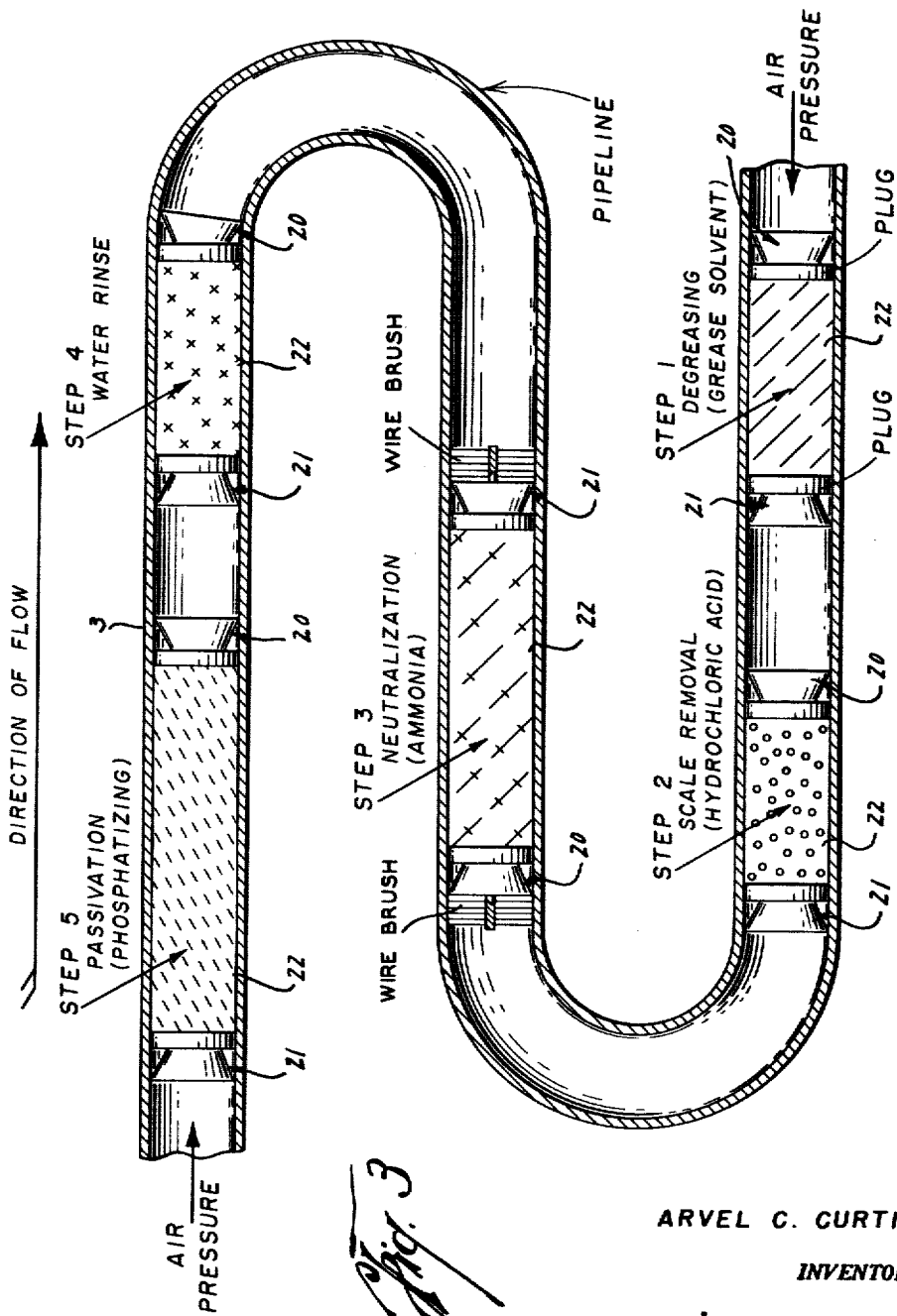

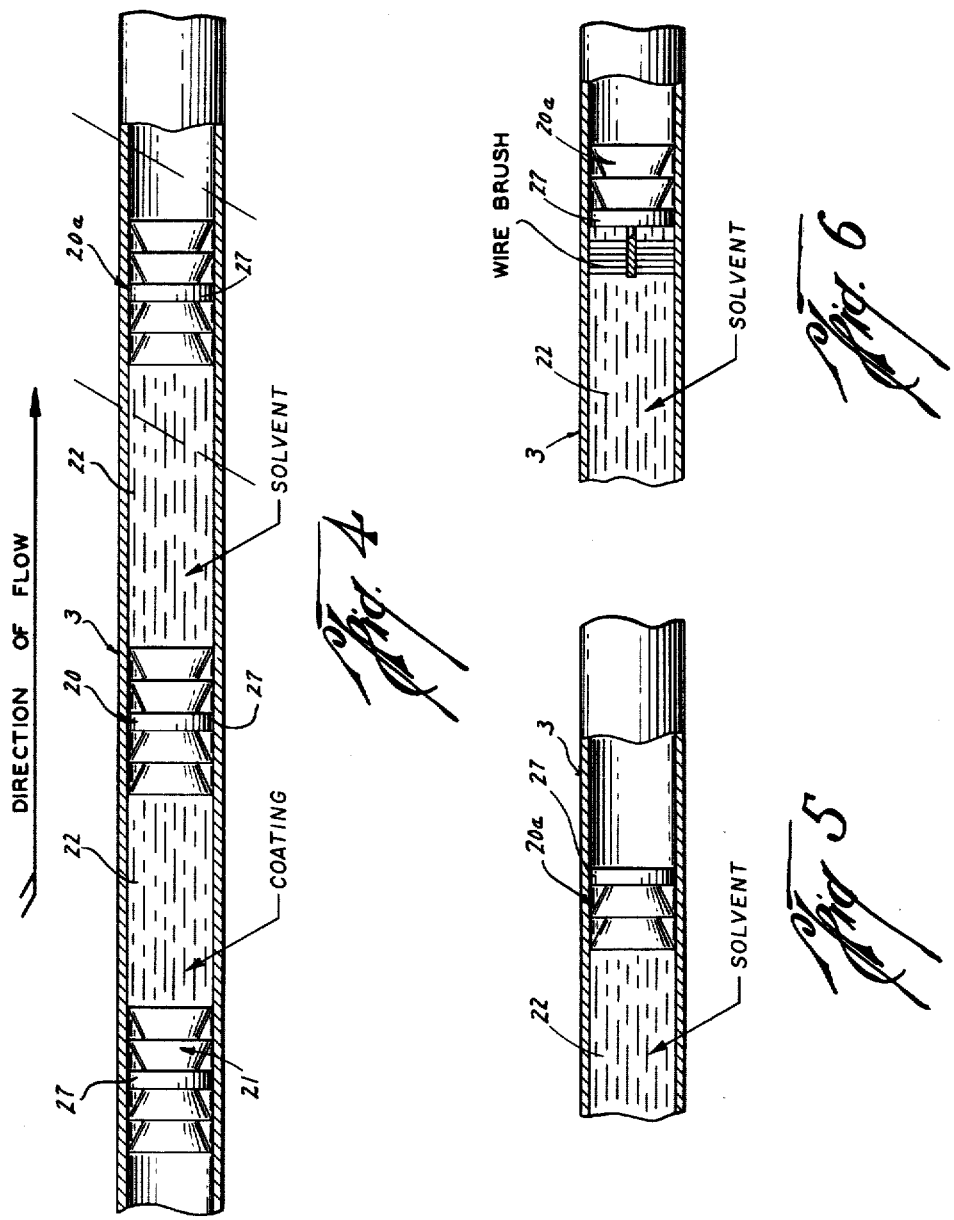

United States Patent Office 3,108,012
Patented Oct. 22, 1963

3,108,012
METHOD OF CONDITIONING TRANSMISSION
LINES IN SITU
Arvel C. Curtis, Dallas, Tex., assignor to Pipelife Corporation, Dallas, Tex., a corporation of Delaware
Filed July 20, 1960, Ser. No. 44,191
1 Claim. (Cl. 117—95)

The present invention relates to a method of conditioning transmission lines in situ underground, and more particularly to a method of cleaning and coating and then drying the coated transmission line in situ underground.

It is common practice to provide pipe lines or transmission lines with exterior coating as the pipe lines or transmission lines are positioned in the earth's surface to inhibit corrosion and electrolytic action which might deteriorate pipe sufficiently to eventually cause a rupture or a break therein. However, the interior coating of a pipe is of fairly recent development, and the major part of such interior coating is now accomplished joint by joint prior to the time that the joints are coupled together and lowered into the earth's surface.

Various means are used for connecting the joints of pipe together, the most common form being to weld adjacent joints together. Welding of the adjacent joints heats the pipe joints at the welds and causes the interior of the lines at the welds to be exposed to rust, corrosion and electrolysis, so that for all practical purposes the joint by joint method of coating pipe prior to its connection in a transmission line does not provide a uniform protective coat throughout the extent of the transmission line from its origin to its point of termination.

Also, connecting joint of pipe together by welding as above described creates an annular projection or rib extending within the pipe at 30 or 40 foot intervals where the joints are welded together, and as fluids or liquids are conducted through the transmission line these projections cause flow turbulence thereby increasing the friction in the line and decreasing the throughput of fluids through the line.

At the present time, the most common method of joint by joint coating of pipe is performed by moving a sprayhead longitudinally of each joint prior to the time they are connected together to form a pipe line. Coating material is discharged through the sprayhead into the interior of the pipe as the sprayhead is moved longitudinally in the pipe.

Where a sprayhead is moved through joints of pipe, as hereinabove described, it is difficult, if not impossible to ascertain whether or not all of the exposed interior of the joints have been coated. Also, it is impractical to determine whether the joints have been coated evenly or uniformly throughout their axial extent. For example, in some instances the sprayhead may become momentarily clogged so that flow therefrom to the interior of the joint of pipe being coated is stopped which of course leaves exposed portions of surface on the interior of the pipe. Also, when the sprayhead becomes clogged momentarily, coating material collects therein so that when it subsequently becomes unclogged as it moves through the joint of pipe, a relatively large volume of coating material is deposited at one point on the interior of the pipe thereby causing an uneven application of the coating material. The resulting mass of coating material under such circumstances forms an irregularity on the interior of the pipe and hinders smooth uninterrupted flow of fluid through the transmission line.

Not only are problems encountered in applying a coat of material where the joint by joint method is employed, but cleaning of the pipe joints to receive the coating creates additional problems. Also, proper curing or drying of the coating material in a manner so as to decrease, if not eliminate damage to the coating as it dries is extremely difficult, if not impossible under present conditions and methods which are employed.

Additionally, many transmission lines were originally placed in the earth's surface without the application of interior coating. The corroding and scaling of such untreated transmission lines becomes excessive after an extended period of use and necessitates that the lines be properly treated eventually to inhibit further corroding and scaling. Present pipe coating methods would necessitate their removal from the earth by disconnecting the line joint by joint and then endeavoring to clean and coat the joints so that they may be reconnected and put in service.

The cost and problems of removing the line would, in most instances, be such that the project could not be successfully undertaken. Such pipe lines would merely be replaced, as they become worn out.

The present invention provides a method for overcoming all of the above and other unnamed problems presently encountered in interior coating of pipe lines or transmission lines.

More particularly the present invention relates to a method whereby a transmission line may be coated, cleaned and properly dried or cured in situ underground in a manner to overcome the aforementioned and other problems in connection with the interior coating of pipe lines.

A further object of the present invention is to provide a method whereby a transmission line may be cleaned in situ underground to remove deposits, scale and corrosion therefrom prior to applying a coating on the interior of the transmission line.

Still a further object of the present invention is to provide a method whereby a transmission lin in situ may be first cleaned to remove all foreign material from the interior surface thereof, then coated uniformly over its entire circumferential extent, and then the coating dried in a manner so that the coating surface attains a proper cure or set within the transmission line.

Still another object of the present invention is to provide a method whereby slugs of cleaning material, coating material and drying fluid may be conveyed sequentially through a transmission line in situ to clean the entire circumferential extent of the transmission line, to then apply a uniform coating of material throughout the circumferential extent of the transmission line, and the coating uniformly dried or cured throughout the circumferential and longitudinal extent of the transmission line.

Yet a further object of the present invention is to provide a method of conditioning a transmission line in situ wherein cleaning material, coating material, and a drying fluid, in the order named, may be moved through a transmission line in situ underground to clean and coat the transmission line.

Still another object of the present invention is to provide a method whereby cleaning, coating and drying fluids may be moved sequentially through a transmission line in situ underground, such moving including the steps of positioning barriers in the transmission line to form a chamber for receiving the cleaning material in the line, and applying a fluid pressure on each of the barriers, with the fluid pressure on one of the barriers being greater than the fluid pressure on the other barrier so that the barriers and filled chamber of cleaning material may be conveyed through the transmission line.

Still another object of the present invention is to provide a method whereby cleaning, coating and drying fluids may be moved sequentially through a transmission line in situ underground, such moving including the steps of positioning barriers in the transmission line to form a chamber for receiving the cleaning material in the line, and then positioning additional barriers in the line to form a chamber therein for receiving coating material therein, and applying a fluid pressure on each of the barriers, with the fluid pressure on one of the barriers being greater than the fluid pressure on the other barrier so that the barriers and filled chamber of coating material may be conveyed through the transmission line.

Still another object of the present invention is to provide a method of predetermining the thickness of a coating material applied internally of a transmission line in situ underground.

Yet a further object of the present invention to be provide a method of conditioning a transmission line in situ underground which includes the steps of filling a space in the line with a cleaning material, and moving the cleaning material through the transmission line by applying air pressure at each end thereof, with the air pressure at one end being greater than the air pressure of the other end so that the cleaning material moves through the line and contacts the line throughout its circumferential and longitudinal extent, coating the line by placing a quantity of coating material dispersed in a solvent within a space in the transmission line, and applying air pressure at each end of the space in the line with the pressure at one end of the space being greater than the pressure at the other end of the space so that the coating material moves through the transmission line and contacts the transmission line throughout its circumferential and longitudinal extent, and thereafter maintaining an air pressure in the coated transmission line to prevent the evaporation of the solvent from the coating material at a rate sufficient to creat bubbles or blisters in the material, while simultaneously circulating air through the line to aid in the drying or curing of the coating material.

A further object of this invention is to apply a solvent coating in a transmission line immediately in advance of a coating, which solvent is compatible with the coating to attain a more uniform coating on the pipe.

Other objects and advantages of the present invention will become more readily apparent from a consideration of the following description and drawings wherein:

FIG. 1 schematically illustrates the method of the present invention being employed on a section of pipe line or transmission line; and, FIG. 2 is an enlarged sectional view, partly in elevation, showing one form of part of the apparatus which may be employed for performing the method of the present invention;

FIG. 3 is an enlarged sectional view of a portion of a pipe line showing the various steps in conditioning the transmission line;

FIG. 4 is an enlarged sectional view of a portion of a pipe line showing one manner of applying a solvent and a coating to the pipe wall;

FIG. 5 is a view showing another form of plug; and

FIG. 6 is a view showing still another form of plug or barrier.

Attention is first directed to FIG. 1 of the drawings wherein a transmission line is illustrated in situ and designated generally by the numeral 2. It can be appreciated that the transmission line to be treated may be of any length, such as by way of example from a relatively short length to many hundreds or even thousands of miles. The present method is practiced upon contiguous longitudinally extending portions of the transmission line beginning at one end of the transmission line and continuing throughout its extent to its termination. The length of the portion conditioned will vary upon many factors depending upon for example, the size of pipe in which the process is to be employed, the type of coating material to be applied, weather conditions, and other factors.

However, regardless of the length of the transmission line, it may all be conditioned by the method of the present invention, and generally speaking each portion of the pipe line will be sequentially cleaned, coated and dried in accordance with the method of the present invention.

In the drawings, the portion of the transmission line to be treated is designated at 3. The reference numeral 4 represents a portion of the transmission line which has been previously treated by the method of the present invention. The portion 5 of the transmission line 2 represents the next portion of the transmission line 2 which will be conditioned after the portion 3 has been conditioned.

At each end of the portion of the transmission line which is being conditioned, such as the portion 3, there may be secured an elongated tubular element 7 and 8 respectively as illustrated in the drawings. These elements may be secured by any suitable means in the transmission line and provide means for ingress and egress to the portion 3 of the transmission line 2 which is being conditioned. For example, the tubular member 7 will be connected at one end of portion 3 of the transmission line, and the member 8 will be secured at the other end of the portion 3. The length of portion 3 between the members 7 and 8 may vary, and can easily be as much as 20 or 50 miles, or more, depending upon numerous factors.

In order to connect members 7 and 8 to portion 3, short sections or portions of the transmission line 2 can be disconnected from the line by first excavating or uncovering the line 2 as illustrated in FIG. 1. This enables tubular elements 7 and 8 to be temporarily connected into the portion of the line to be conditioned, which in the drawings is represented by the numeral 3. As will be described in greater detail hereinafter, the removed sections or portions are conditioned and after the portion 3 of the transmission line 2 between the tubular elements 7 and 8 has been conditioned, the members 7 and 8 are then removed and the conditioned portion is then ready to be connected back into the transmission line. The tubular members 7 and 8 are thereupon connected to the next contiguous longitudinal portion of the transmission line and the conditioning operation repeated. The member 8 is adjacent the portion 5 to next be conditioned, and it, after connecting to portion 5, will assume the relationship represented by member 7 on portion 3. The member 7 may be connected to the other end of portion 5, in which event it will then assume the same function that member 8 performs when connected to portion 3 as illustrated in the drawings. This operation is sequentially repeated on longitudinal portions of the transmission line from its origin to its termination so as to completely coat the pipe line portions in situ.

The tubular elements 7 and 8 are secured to the portion 3 of the transmission line to be treated in any suitable manner to facilitate their quick connection in place, and to facilitate their quick disconnection for positioning on the next adjacent portion of the transmission line to be conditioned. As noted in the drawings such connection includes the coupling designated generally by the numerals 7' and 8' for the tubular elements 7 and 8 respectively. Also, the tubular element 7 and the tubular element 8 is provided with a suitable form of quick closure arrangement for the end thereof, which closure is represented generally by the numerals 9 and 10 respectively whereby the ends of the tubular elements 7 and 8 may be opened and closed as desired in carrying out the method of the present invention.

Suitable valves of any particular form may be provided on each of the elements 7 and 8 as illustrated at 11, 12, 11a and 12a respectively, whereby fluid pressure internally of the transmission line may be regulated or controlled as will be described in greater detail hereinafter. A suitable pressure indicating gauge 13 and 13a is connected on each of the tubular elements 7 and 8 respectively to visually indicate the pressure existing within the elements and existing within the portion of the transmission line being conditioned for a purpose as will be explained in greater detail hereinafter. Also, valve means as illustrated at 14 and 14a are provided in each of the tubular elements 7 and 8 respectively whereby material may be injected into the tubular elements for subsequent transmission through the portion 3 of the line in order to clean and coat the transmission line in accordance with the method of the present invention, and may be ejected at the other end of the line being conditioned.

Additionally, valve means 15 and 15a are provided adjacent the end of each of the tubular elements 7 and 8 respectively whereby a fluid medium, such as air, may be conveyed from the air compressors 16 and 16a arranged respectively at each end of the portion 3 of the transmission line to be conditioned. The air is conducted from the compressors through suitable hoses as illustrated at 17 and 17a to the respective valve means 15 and 15a and thence internally of the elements to the transmission line.

In order to clean and coat the interior of the transmission line 2, suitable barrier means as illustrated generally at 20 and 21 in FIGS. 1 and 2 are provided which are spaced to form the chamber 22 therebetween of a desired volume. The barriers 20 and 21 may be of any suitable construction and in effect form plugs or "pigs" which are adapted to be moved through the transmission line by air pressure as will be further described hereinafter.

It can be appreciated that the construction of the tubular elements 7 and 8, as well as the arrangement of the valves 11, 12, 14 and 15 is not critical to the present invention. Also, the construction and arrangement of the barriers or plugs 20 and 21 may be of any suitable form in practicing the present invention. For example, the plugs or barriers 20 and 21 as illustrated in FIGS. 1, 2 and 4 of the drawings may comprise a plurality of rubber elements which are generally of the shape as illustrated at 23, 24, 25 and 26 in FIG. 2. An annular portion 27 is illustrated as being connected between the members 24 and 25. In some circumstances, it may be desirable to provide the ring portion 27 with circumferentially extending mechanical means for engaging the interior of the pipe surface as the plugs move therethrough. One suitable form of mechanical means which may be used is a wire brush.

The rubber elements 23, 24, 25 and 26, as well as the annular rubber ring 27 are of sufficient resiliency so that they move through the line, but are sufficiently rigid so as to retain their relationship when air pressure is applied on each end thereof in order to move the barriers 20 and 21 through the transmission line.

Another form of plug is illustrated in FIGS. 3, 5 and 6 which are shorter in longitudinal extent than those shown in FIGS. 1, 2 and 4.

Also, the diameter of the "pigs" or plugs 20 and 21 is substantially the same as the transmission line or pipe to be conditioned so that the barriers 20 and 21 will form a snug fit with the pipe as they move therethrough. The construction of the barriers 20 and 21 is not critical and any suitable arrangement may be used in practicing the present invention.

It can be appreciated that the conditioning of the transmission line will depend upon many factors such as the type of material normally moved through the line, the extent and nature of deposits, the amount of scale and corrosion on the interior of the pipe, etc. At any event, in practicing the present method it is essential that the entire inner periphery of the transmission line be thoroughly cleaned in order to present a surface to which the coating material will properly bond. Additionally, it is essential that the coating material be applied uniformly and continuously throughout the extent of the portion of the transmission line being conditioned to avoid voids or bare spots therein.

The conditioning operation consists essentially of cleaning the pipe, coating the pipe and then drying the pipe in a manner so that the coating will be thoroughly and quickly dried, but in a manner to inhibit imperfections in the coating. Of course, any material in the line will be first discharged therefrom, and it may be accomplished by pumping it out, or by moving one or more of the barriers 20 or 21 through the pipe line.

The cleaning may be conducted by first positioning one of the barriers such as the barrier 20, as illustrated in FIG. 1, in the end of the receiving barrel or tubular element 7. This is accomplised by removing the closure 9 and inserting the "pig" or barrier therein. The end of the barrel is then closed and air pressure supplied through the hose 17 so as to move the barrier 20 along the barrel and into the pipe line to a position such as that represented in FIG. 1 of the drawings. If desired the members 7 and 8 may be provided with enlargements on their outer ends to which the closures 9 and 10 respectively are secured, so as to facilitate the positioning of the plugs within the members 7 and 8.

After the barrier 20 has been inserted, any excess air pressure in element 7 may be relieved by opening the valve 12. The closure 9 may again be opened and the barrier 21 then positioned in the barrel or tubular element 7 and longitudinally spaced from the barrier 20 to form a chamber or void 22 therebetween. As previously noted, the diameter of the barriers 20 and 21 is such that they will each fit snugly adjacent the inner wall of the barrel or tubular element 7, and the elements 7 and 8 in turn are substantially the same diameter of the pipe line to which they are secured so that the barriers 20 and 21 will be in close proximity to the inner periphery of the transmission line as they are moved therethrough. A cleaning fluid or material is then discharged from a suitable source through a pipe or conduit connected to valve 14 and then discharged into the interior of the barrel 7 to the chamber 22 between the barriers 20 and 21 until the chamber is filled. It is essential that the chamber be filled so that complete contact of the cleaning material and the inner periphery of the transmission line is assured as the cleaning material moves therethrough. The valve 14 is then closed, as are valves 11, 12, 11a, 12a and 14a.

The barriers 20 and 21 and the filled chamber 22 are now ready to be moved through the portion 3 of the transmission line. To accomplish this, air pressure is conducted from compressor 16 through line 17 to act on the end 30 of the barrier 21, and air pressure from compressor 16a is simultaneously conducted through hose 17a to the transmission line to act on the end 32 of the barrier 20. The amount of air pressure on the end 30 of the barrier 21 is adjusted to exceed the air pressure acting on the end 32 of the barrier 20 so that the barrier 20 and the barrier 21 with the filled chamber therebetween are propelled through the transmission line as a unit. It can be appreciated that the rate of movement of the barriers 20, 21 and filled chamber 22 will depend upon the type cleaning material and desired contact time of the cleaning material with the interior walls of the transmission line. The air pressure on the end of each of the barriers may be observed on the gauges 13 and 13a so that desired pressure differential can be maintained in the pipe line or as the barriers are moved therethrough. A greater pressure normally will be maintained on the trailing barrier 21 than on the leading barrier 20 and the speed of the barriers 20 and 21 with a filled chamber therebetween may be anywhere from 1 to 20 or 25 miles per hour, depending upon the contact time desired between the cleaning material and the transmission line as previously noted hereinabove.

As a practical matter, it has been determined that a rate of 10 miles per hour furnishes satisfactory results, and if this rate of movement is desired, a pressure differential of approximately 15 to 20 lbs. per square inch across the barrier, chamber 22 and barrier 21 should be maintained. In other words, the pressure on the leading barrier 20, in such event, may be approximately 10 lbs. per square inch, and the pressure on the trailing barrier 21 may be approximately 30 lbs. per square inch.

The cleaning operation will continue until the interior of the transmission line has been thoroughly cleaned of all deposits including paraffin, rust, mill scale and the like. It may be necessary to send several groups of barriers and filled chambers of cleaning material through the transmission line before the interior is satisfactorily cleaned. In some circumstances several passes of the cleaning material may be accomplished by reversing the air pressure on the barriers.

After the cleaning operation is complete, the barriers 20 and 21 and solvent or cleaning material therebetween will be moved to member 8 at the opposite end of the transmission line. The chamber 22 is then communicated through valve 14a and pipe 33 to receptacle 14b so that the cleaning material may be pumped from between the barriers. The barriers then may be removed to assure complete swabbing of the cleaning material from between the barriers.

The last step of the cleaning is to wash the line to insure that all previous cleaning fluids and water and other contaminants have been removed from the transmission line prior to the application of the coating material. In order to accomplish this, it is desirable if not necessary to treat the cleaned transmission line with a material which is compatible to the solvent that is used in the coating material. Methyl ethyl ketone is the solvent used in the epoxy resin that forms one suitable coating material which may be employed in practicing the present invention, and therefore the transmission line should be flushed with methyl ethyl ketone prior to the application of the coating material. The methyl ethyl ketone may be applied in the portion 3 of the transmission line in a manner as previously described with regard to the cleaning material.

The barrier 20 is first positioned in the tubular element 7, the element 7 then closed and the barrier 20 pumped down the transmission line a suitable distance. The barrier 21 is then positioned in the tubular element 7 to form the chamber 22 of desired volume therein between the barriers 20 and 21. This chamber is then filled with the methyl ethyl ketone and by applying air pressure through the valves 15 and 15a in the tubular elements 7 and 8 so as to act on the end of each of the barriers 20 and 21 the methyl ethyl ketone is moved through the transmission line at a desired rate. Suitable pressure is maintained on the leading barrier 20 and on trailing barrier 21 to insure that the chamber 22 remains filled at all times thereby assuring that the methyl ethyl ketone contacts the transmission line throughout its circumferential extent as the barriers 20 and 21 and filled chamber 22 move through the portion 3 of the transmission line as a unit. When the barrier 20 reaches the end of the tubular element 8 at the end of the portion 3 being treated, the excess methyl ethyl ketone may be pumped out the discharge line 33 whereupon the closure 10 may be opened for removal of the barriers 20 and 21. It can be appreciated that if desirable a series of slugs of methyl ethyl ketone may be conveyed through the transmission line to insure complete cleaning thereof prior to coating.

Since the final wash in the transmission line is accomplished by means of a chemical which is compatible with the solvent in the coating material, it can be readily appreciated with the coating material is completely miscible with the film of wash fluid thereby aiding in uniformly spreading the coating composition over the inner periphery of the transmission line.

The coating operation is carried out in the same manner as the cleaning operation above described. A first barrier is positioned in the transmission line and pumped down the line a suitable distance whereupon a second barrier is inserted in the transmission line to form a chamber 22 between the two barriers of desired volume. The space between the two barriers is completely or chamber 22 between the two barriers is completely filled with coating material. The barriers and the filled chamber are then pumped down the transmission line, being sure that the barriers are retained in relation to each other so that the chamber therebetween is filled with coating material at all times to insure complete contact of the coating material and the transmission line over its complete circumferential extent throughout its longitudinal extent. In order to move the barriers and coating material down the transmission line as a unit, pressure is again exerted on the leading barrier, and pressure is also exerted on the trailing barrier, with the pressure on the trailing barrier exceeding that on the lead barrier so that the two barriers and the filled chamber therebetween are moved through the transmission line.

When the barriers reach the tubular member 8 at the other end of the portion 3 of the transmission line which is being treated, they may be removed therefrom after the excess of material has been pumped from therebetween. The material may be removed by discharging it through the valve 14a and line 33 to receptacle 14b, as previously described with regard to the cleaning material. The rate of movement of the barriers and the filled chamber therebetween along the transmission line determines the thickness of the coat of material applied to the interior of the transmission line. This thickness may vary for practical purposes between .002 inch in thickness and .020 inch in thickness. In some circumstances it may be less than or greater than this amount; however, for most practical purpose the thickness will be approximately .005 or .006 inch.

In order to dry the coating composition in the length of pipe 3, it is necessary to remove the solvent therefrom. It is desirable to accomplish this as quickly as possible on the one hand, while on the other hand it is necessary that the rate of solvent removal not be such so that it creates blisters or bubbles in the coating composition which would cause imperfections in the coating surface when it dries. In order to accomplish the drying in a desired manner, it is necessary to maintain an air pressure within the coated line in an amount in excess of the vapor pressure of the solvent within the line, while simultaneously renewing the supply of air within the line so that the saturated air and solvent may be removed from the coated line to enable quicker drying thereof. This may be accomplished by pumping air into the tubular element 7 continuously while withdrawing the air continuously through the valves 11a and 12a on the tubular member 8. The valves 11a and 12a on the member 8 may be adjusted so that a suitable back pressure is created within the line which is sufficient to prevent the formation of bubbles or blisters in the coating composition as it is dried. The amount of air pressure maintained within the coated line as it dries may vary upon particular circumstances but a pressure between 10 and 20 lbs. per square inch gauge is satisfactory. A preferred pressure is that where the air pressure is maintained at 50 lbs. per square inch gauge in the coated line as it dries.

After the coating is dry, the end of the portion 3 may be connected with the portion 4 on the left-hand end of FIG. 1. This may be accomplished by reinserting that part of the pipe line which was removed to enable connection of tubular element or barrel 7 in place on the left-hand end of portion 3, as represented in the drawings. The other end of portion 3 is left disconnected until portion 5 has been completely conditioned, whereupon the right-hand end of portion 3, and the left-hand end of portion 5, as viewed in the drawings, may be connected by reinserting the removed portion of the transmission line therebetween.

To further amplify and describe the cleaning, coating and drying operation, it will be assumed that the method is to be applied to a line which has considerable hydrocarbon deposits therein, as well as rust, corrosion and mill scale. Ordinarily, the portion of the transmission line which is to be treated will be first of all discharged of its normal constituents by pumping a barrier or "pig" through the line. After this is accomplished the hydrocarbon deposits, such as paraffin and the like, may be removed by placing a suitable solvent in the chamber 22 between barriers 20 and 21, as illustrated in FIG. 3 of the drawings. Suitable solvents for accomplishing this purpose are Varsol, standard solvent, xylol, Tolvol, as well as ketones, glycol ethers, nitroparaffins, chlorinated solvents or any other relatively high boiling aliphatic or aromatic naphthas.

The barriers 20 and 21 will be positioned in the element 7, shown in FIG. 1, to form the chamber 22. The solvent is discharged from a container through a hose to valve 14 and then into the chamber 22 until the chamber is filled. The chamber 22 along with the barriers 20 and 21 is then conveyed through the pipe line portion 3 being treated by means of air pressure as described hereinbefore. The pressure within the line will be maintained at a point so that the chamber 22 is full at all times to assure proper contact of the solvent with the complete circumferential extent of the transmission line to enable all solid hydrocarbons to be dissolved in the solvent. The rate of movement of the solvent for dissolving hydrocarbons through in the transmission line may be varied depending upon the severity of deposition, but a rate of 10 miles per hour serves the purpose quite well. In other circumstances the rate may vary between 3 and 20 or 30 miles per hour as desired. The chamber 22 will be of a suitable size so that a sufficient volume of solvent is present to dissolve all oils and solid hydrocarbons in the portion 3.

After the transmission line has been treated to remove the liquid and solid hydrocarbons therefrom, it may next be treated to remove scale, corrosion and rust. Any suitable acid may be used to aid in accomplishing this result, and hydrochloric acid in strength of approximately between 10% and 20% by weight has been found quite satisfactory. The acid may contain inhibitors to prevent erosion of the pipe wall or wetting agents to enhance the activity and speed of removal of rust and scale. In certain situations where the corrosion and scale or rust is not excessive, phosphoric acid in the range of 5% to 50% by weight may be used. Where the corrosion and scale are severe, inhibited hydrofluoric acid in the range of 10% to 20% by weight should be used.

The acid is conveyed through the transmission line in a manner similar to that described with regard to the solvent, and this step is also illustrated in FIG. 3 of the drawings. The barriers 20 and 21 are inserted in element 7, and spaced to form a chamber 22. The acid is then discharged into the chamber 22, and the chamber 22 along with barriers 20 and 21 is then propelled through the transmission line portion 3 so that the chamber 22 is retained full at all times to insure intimate contact of all portions of the interior periphery of the transmission line. If desired, more than one acid wash may be employed to assure that all of the interior of the pipe has been contacted by the acid, and the rate of movement of the acid through the pipe will be such that the acid may move into the pores of the metal of the transmission line. Here again any suitable speed may be employed, and a speed of 10 miles per hour of the chamber 22 filled with acid through the transmission line has been found quite satisfactory.

After the acid wash, it is then necessary to neutralize the acid and a base or caustic may be employed for this purpose. This step is also illustrated in FIG. 3 of the drawings. Aqueous ammonia has been found quite satisfactory as a neutralizing agent, and may be employed in any suitable strength, a strength of approximately 5% to approximately 30% by weight having been found quite acceptable. The neutralization of the acid by the aqueous ammonia is accomplished by pumping slugs of ammonia through the line in a manner as previously described with regard to conveying the solvent and acid through the transmission line.

After the neutralization of the acid is completed, it is then desirable to subject the transmission line to a water rinse, as shown in FIG. 3 of the drawings, to aid in eliminating excess ammonium hydroxide, both soluble and insoluble salts, as well as loose deposits from the portion 3 of the transmission line. The water rinse is carried out in a manner to that similarly described with regard to the solvent and acid washes heretofore described and is continued until the pH of the water discharged into the transmission line at the tubular element 7 is substantially the same as the pH of the water when it is removed from the line at tubular element 8. This may be determined by a manner well known in the art, and also the discoloration of the water should be at a minimum which indicates that all suspended matter and soluble salts have been removed from the portion 3 of the transmission line.

At this point in the method, it should be noted that the transmission line is ready for receiving the coating material, and may have the coating material applied thereto; however, since the chemical reaction involving rust or corrosion is one which may occur in a relatively short period of time, it is suggested that the metal surface be treated to inhibit the formation of rust thereon. As illustrated in FIG. 3 of the drawings, this may be accomplished by conducting phosphoric acid through the transmission line in order to phosphatize the cleaned pipe. While suitable strengths of phosphoric acid may be employed, a strength of approximately 5% to approximately 50% by weight has been found most satisfactory. The phosphoric acid is conducted through the transmission line, as labeled on FIG. 3, in a manner similar to that previously described, and if desired repeated filled chambers or slugs of phosphoric acid may be conducted through the line to assure complete and intimate contact between the phosphoric acid and the complete area of the internal periphery of the pipe line.

In some certain circumstances after the phosphatizing, it may be desirable to again subject the cleaned pipe to a water wash. At any event, after the phosphatizing the coating material may be applied to the interior of the pipe.

Each of the foregoing steps may be an individual operation or may be a part of a train passing through the line at respective intervals. In the case of the latter, the individual steps may be broken up into smaller increments by intermediate plugs to facilitate more efficient cleaning.

In order to assure that no foreign matter or liquid substances are adhering to the interior of the transmission line, and to aid in uniformly distributing the coating material on the interior of the line, it is desirable to wash the transmission line with a material which is compatible with the solvent used in the coating material. This step is illustrated in greater detail in FIGS. 4, 5 and 6. As shown in these figures, the solvent is conducted through the pipe line immediately in front of the coating composition.

In coating a line with materials to resist corrosion and to provide a smooth film of good adhesion, a dry surface or one having a very low moisture content and free of oil is necessary. Moisture left on the surface to be coated not only resists wetting by the coating but may become entrapped between the metal and the coating, thus providing sites of future film failure.

In the previous steps of conditioning, various substances were passed through the line, prior to coating, in separate phases of operation, using compressed air. The compressed air may contain contaminants including moisture and possibly oil. By passing the solvent immediately ahead of the coating, the possibility of any contaminants contacting the cleaned line prior to the coating is substantially eliminated.

As shown in FIG. 4, the pipe line portion 3 is to be coated with a coating material contained in the chamber 22 between the two plugs 20 and 21, and is propelled through the line from left to right, as indicated by the arrow, by air pressure. Immediately in front of the leading plug 20 is confined, by a third plug 20a, a body of a suitable solvent in the chamber 22 which solvent is compatible with the coating material to be applied to the interior of the pipe line. The coating material then contacts this clean wall while it is still wet with the solvent, but substantially free of contamination. By virtue of the volume of solvent used, any contaminants absorbed become only a small percentage of the solvent film laid down after the passage of the plug 21a and are readily absorbed by the coating that follows, thus constituting no substantial hazard to the coating film.

The solvent used may be one of many showing sufficient compatibility with the coating so as to blend readily with the material used. In addition, the solvent used should be a fast evaporating one in order that it will be quickly dissipated from the final coating. As previously noted, an example suitable in coating with epoxy resins would be methyl ethyl ketone. Other solvents are acetone, ethylene dichloride, 1,1,1-trichloroethane and the like.

The plugs 20 and 21 of FIG. 4 are of the same type as shown in FIGS. 1 and 2, having two cups opening at each end with a central ring 27. Other types can be used such as the type shown in FIG. 5 which has an end ring with cups opening only toward the solvent body; or that of FIG. 6, which has the end ring and cups opening only away from the solvent body with an annular wire brush which brushes the wall in advance of the main body of solvent to aid in insuring more thorough cleaning.

The compressed air used to propel the barriers 20, 21 and filled chambers through the pipe line may be cleaned and dried prior to injecting it into the line to aid in removing moisture and contaminants therefrom. The cleaning and drying may be accomplished by any means and with any suitable desiccant.

It should be noted that the type of material used as this final wash fluid will vary depending upon the solvent used in the coating material. Where epoxy resins are used and are dispersed in a solvent of methyl ethyl ketone, then methyl ethyl ketone serves quite well as the final wash prior to the application of the coating composition. This deposits a uniform film on the interior of the pipe while simultaneously removing any water or other foreign contaminants which might interfere with the proper application of the coating substance on the interior of the pipe line.

After the coating material has been applied in a manner as previously described herein, it is then necessary to properly dry or cure the coating material by dissipating the solvent therefrom. The drying operation is conducted in a manner as previously described so that the solvent is quickly removed from the coating composition, but is not removed so rapidly that it creates bubbles or defects in the surface of the coating composition.

The foregoing method provides a relatively quick and economical method of conditioning transmission lines in situ underground. The transmission lines may be conditioned so as to first clean them, and they may thereafter be coated with a uniform thickness of coating composition to assure that all exposed internal surfaces of the transmisison line have been coated. This greatly reduces corrosion in the transmission line as well as eliminating electrolysis. Furthermore, the coating composition is of a nature so that it is relatively smooth thereby decreasing the friction between the substance moved through the transmission line and the transmission line. This in turn increases the throughput through the transmission line, the economic import and implications of which can be readily understood.

It can therefore be appreciated that the drying operation of the coating composition is most important and while being accomplished in a manner so as to eliminate imperfections in the coating surface, it is accomplished as quickly as possible since air is continuously discharged into, and is being continuously withdrawn from the coated line. This enables a fresh supply of air to be continuously supplied to the line so that as the air within the line becomes saturated with the solvent from the coating composition, it may be discharged from the line to the surrounding atmosphere.

In some situations it may be desirable to aid the chemical cleaning of the interior of the transmission line by employing some form of mechanical means such as a scraper or the like which is adapted to be moved through the transmission line. In such event the annular rings 27 of the barriers 20 and 21 may be provided with wire brushes so that as the barriers 20 and 21 move through the transmission line with the solvent and acid therebetween as well as when they are used with the neutralizing agent, the wire brushes will contact the interior of the transmission line and aid in removing deposits therefrom. Of course, it is preferable that the coating composition be applied without agitating the surface of the pipe, and in the coating step, the barriers 20 and 21 would not have wire brushes thereon.

To further amplify and by way of illustration, the following examples illustrate proposed procedure for cleaning 12 miles of 6 inch line, and 8,000 feet of 8 inch line respectively.

EXAMPLE 1

Twelve Miles of 6-Inch Line

The members 7 and 8 are first positioned at each end of the twelve mile line.

*Degreasing.*—The necessity of degreasing a line may be determined by a visual inspection. In the event a visual inspection indicates that the transmission line has deposits of hydrocarbon, such as paraffin therein, it may be dissolved by acetone as the solvent. In this example a total of 350 gallons of acetone would be employed and would be moved through the line between barriers in a manner previously described therein, preferably at a rate of approximately 10 miles per hour. Wire brushes may be utilized on the barriers 20 and 21.

*Rust removal.*—Approximately 1,500 gallons of 15% inhibited hydrochloric acid may be positioned in the chamber 22, and the barriers then moved through the transmission line at a rate of approximately 10 miles per hour. This may be followed with a second slug of acid comprising approximately 1,000 gallons of approximately 15% inhibited hydrochloric acid, forced through the transmission line at the rate of approximately 10 miles per hours. Wire brushes may be provided on the barriers 20 and 21.

*Neutralizing.*—Barriers 20 and 21, provided with wire brushes on the annular surfaces 27, may be spaced to receive 200 gallons of 26° Bé. aqueous ammonia and 1000 gallons of water. The barriers and the filled chamber are then forced through the transmission line at the rate of approximately 10 miles per hour.

*Water rinse.*—The barriers 20 and 21 are again provided with wire brushes on the annular surface 27, and spaced so as to receive 1000 gallons of water in the chamber 22 therebetween. This is forced through the transmission line at approximately a rate of 10 miles per hour, and while two passes in this volume should be sufficient, the water rinse should be continued until the entering pH of the water, and the pH of the water when discharged is substantially the same. Also, the clarity of the discharge water should be substantially the same as the clarity of the water entering the transmission line.

*Phosphatizing.*—The barriers 20 and 21 may be provided with wire brushes thereon and spaced so as to receive 2,000 gallons of 20% phosphoric acid therebetween. This may be forced through the transmission line at approximately 10 miles per hour.

*Rinse.*—Barriers 20 and 21 will be provided with smooth surfaces so as to not agitate the interior of the transmission line as is the case with the wire brush "pig," and will be spaced so as to receive 1000 gallons of water in the chamber 22. This will then be moved through the transmission line.

*Drying.*—The transmission line may be dried with any suitable solvent, being sure that the final solvent is miscible with the solvent used in the coating composition. In this example the barriers 20 and 21, having smooth surfaces, may be spaced to receive 300 gallons of acetone which is then moved through the transmission line at approximately 10 miles per hour. This is then followed with a solvent which is miscible with the solvent used in the coating composition, and in the illustration given herein, the final wash would comprise methyl ethyl ketone in the amount of 300 gallons in the chamber 22, with the barriers 20 and 21 positioned relative to each other so that this amount would completely fill the chamber.

*Coating.*—Assuming that the coating composition would cover 100 ft.²/gallon, this example would require approximately 1000 gallons of epoxy resin. This would be positioned in the chamber 22 between the barriers 20 and 21, the barriers 20 and 21 being positioned so that when this amount is in the chamber 22, the chamber 22 is completely filled. Thereafter, this mass is moved through the line at approximately 10 miles per hour which will yield about .005 inch thickness of coating.

It can be appreciated that in the present invention the longitudinal spacing of the plugs will gradually decrease as they move through the line which assures that the chamber 22 is full of cleaning or coating composition at all times.

*Drying.*—Air pressure is maintained on the entire line in the amount of 50 pounds per square inch, while continuously supplying air to and continuously discharging air from the coated line.

EXAMPLE 2

8,000 Feet of 8-Inch Line

The members 7 and 8 are positioned on each end of the 8,000 foot line.

*Degreasing.*—If visual inspection indicates the presence of hydrocarbon deposits, 150 gallons of acetone in a chamber 22 positioned between barriers 20 and 21 having wire brushes on the annular surface 27 thereof may be moved through the line at approximately 10 miles per hour. It is suggested that when the barriers 20 and 21 and chamber 22 reach the opposite end of the portion 3 of the transmission line being treated, the air pressure be reversed so that they may be conveyed back through the line. When the barriers 20 and 21 and the chamber 22 reach their original position in the line, the air pressure is again reversed so as to move the solvent through the transmission line again. Thus the 150 gallons of acetone are passed through the transmission line three times.

*Rust removal.*—Barriers 20 and 21 having wire brushes on the annular surfaces 27 thereof may be spaced so as to receive 450 gallons of 15% inhibited hydrochloric acid. The air pressure is adjusted so that this is moved through the transmission line at approximately 10 miles per hour, and the air pressure reversed when it reaches the end of the line so that the hydrochloric acid may make a second pass in the line. When the acid reaches its original position the air pressure is again reversed so that it makes a third pass in the transmission line.

*Neutralizing.*—Barriers 20 and 21 having wire brushes on the annular surfaces 27 thereof are spaced so as to receive 30 gallons of 26° Bé. aqueous ammonia with 200 gallons of water in the chamber 22. This is moved through the transmission line at approximately 10 miles per hour.

*Rinsing.*—The barriers 20 and 21 having smooth surfaces thereon are positioned so as to receive 300 gallon increments of water in the chamber 22, and conveyed through the line. This operation is repeated until the water comes out clear as described with Example 1.

*Phosphatizing.*—Barriers 20 and 21 having wire brushes on the annular surfaces 27 thereof are spaced to receive 330 gallons of 20% phosphoric acid in the chamber 22. This is moved through the transmission line three times, at approximately 10 miles per hour.

*Rinses.*—Barriers 20 and 21 having smooth surfaces thereon are positioned in the transmission line to define a chamber for receiving 300 gallons of water. This is moved through the transmission line and discharged at the opposite end.

*Drying.*—Barriers 20 and 21 are spaced to define a chamber therebetween for receiving 200 gallons of acetone which is then moved through the transmission line and discharged. The barriers 20 and 21 are then positioned in the line to define a chamber 22 for receiving 200 gallons of methyl ethyl ketone therein whereupon this may be moved through the transmission line at approximately ten miles per hour and then discharged.

*Coating.*—Assuming that the coating material covers 100 feet²/gallon of material, approximately 165 gallons of epoxy resin will be required. This may be positioned in the chamber 22 defined between the barriers 20 and 21 having smooth surfaces thereupon and conveyed through the transmission line at approximately 10 miles per hour.

*Drying.*—Air pressure is maintained on the entire line in the amount of 50 pounds per square inch, while continuously supplying air to, and continuously discharging air from the coated line.

The total materials, approximately for the two above examples are as follows:

TOTAL MATERIALS

|  | 6" | 8" |
|---|---|---|
|  | Gal. | Gal. |
| Acetone | 650 | 350 |
| Hydrochloric (15%) | 2,500 | 450 |
| Aqueous Ammonia, 26 Bé–29.45% | 200 | 30 |
| Phosphoric Acid 20% | 2,000 | 330 |
| Methyl Ethyl Ketone | 300 | 200 |
| Water (approx.) | 4,000 | 1,100 |

The present method may be varied to suit particular circumstances, but as previously noted, it broadly encompasses cleaning, coating and drying of transmission lines in situ underground.

The chamber 22 when filled, in effect forms a "slug" of material which is conveyed through the line so that the material contacts the circumferential portion of the pipe being conditioned. If desired several slugs may be moved through simultaneously without departing from the scope of the invention. The slower the slugs are moved through the transmission line, the longer the material contacts the pipe; therefore, the thickness of the coating can be regulated by the rate of movement through the pipe. The faster the coating is moved through the line, the thinner the coat, and the slower it is moved through the line, the thicker the coat. Thus the thickness of the coating can be predetermined.

It should also be noted that while I have explained one theory as to how the drying of the coating is accomplished so as to avoid blister formation, such is by way of possible explanation only, and it should be understood that I do not limit my invention to such explanation. The continuous air movement, and continuous air pressure in the coated line does yield most satisfactory results. The results are accomplished in a minimum amount of time and the resulting surface is smooth and uniform.

Broadly, the invention relates to a method for conditioning transmission lines, and more partciularly to a method of cleaning, coating and drying the lines in situ to provide a smooth uniform interior coating thereon.

What is claimed is:

In the process of conditioning hollow transmission lines in situ in which a plurality of cleaning, rinsing and coating agents are pushed through the pipe by spaced leading and trailing movable barriers by air pressure, the improvement which comprises maintaining the pressure of air within the line during substantially the whole drying time for any particular temperature greater than the vapor pressure of the solvent in the coating composition whereby the solvent may be removed from the composition at a rate so that it will not form bubbles in the coating composition as the coating composition is dried.

References Cited in the file of this patent

UNITED STATES PATENTS

| | | |
|---|---|---|
| 2,158,579 | Hodgkins et al. | May 16, 1939 |
| 2,445,645 | Stephens | July 20, 1948 |
| 2,480,358 | Curtis et al. | Aug. 30, 1949 |

FOREIGN PATENTS

| | | |
|---|---|---|
| 500,687 | Germany | June 24, 1930 |

UNITED STATES PATENT OFFICE
CERTIFICATE OF CORRECTION

Patent No. 3,108,012                          October 22, 1963

Arvel C. Curtis

It is hereby certified that error appears in the above numbered patent requiring correction and that the said Letters Patent should read as corrected below.

Column 1, line 33, for "joint" read -- joints --; column 2, line 36, for "lin" read -- line --; column 3, line 13, for "to be" read -- is to --; line 33, for "creat" read -- create --; lines 65 and 66, for "longitionally" read -- longitudinally --; column 11, line 8, for "conamination" read -- contamination --; column 12, line 39, for "therein" read -- herein --.

Signed and sealed this 23rd day of June 1964.

(SEAL)
Attest:

ERNEST W. SWIDER                          EDWARD J. BRENNER
Attesting Officer                              Commissioner of Patents